United States Patent [19]

Tsukagoshi

[11] 3,826,440

[45] July 30, 1974

[54] TAPE CARTRIDGE

[75] Inventor: Tsunehiro Tsukagoshi, Tokyo, Japan

[73] Assignee: Pioneer Electronic Corporation, Tokyo, Japan

[22] Filed: Dec. 20, 1972

[21] Appl. No.: 316,786

[30] Foreign Application Priority Data

Dec. 20, 1971 Japan........................ 46-119452[U]

[52] U.S. Cl............................................. 242/55.19 A
[51] Int. Cl............................................. B65h 17/48
[58] Field of Search............. 242/55.19 A, 199, 200, 242/197, 198; 179/100.22

[56] References Cited

UNITED STATES PATENTS

| | | | |
|---|---|---|---|
| 3,572,568 | 3/1971 | Lutz | 242/55.19 A X |
| 3,606,191 | 5/1969 | Ban | 242/55.19 A |
| 3,685,754 | 8/1972 | Cousino | 242/55.19 A |
| 3,712,552 | 1/1973 | Wada | 242/55.19 A |

FOREIGN PATENTS OR APPLICATIONS

| | | | |
|---|---|---|---|
| 424,301 | 5/1967 | Switzerland | 242/55.19 A |

*Primary Examiner*—Billy S. Taylor
*Attorney, Agent, or Firm*—Sughrue, Rothwell, Mion, Zinn & Macpeak

[57] ABSTRACT

In an endless tape cartridge in which a pinch roller having a larger diameter portion and a smaller diameter portion is pivotably supported such that, when the cartridge is in use, the larger diameter portion abuts under pressure against the tape recorder capstan and the smaller diameter portion abuts under pressure against a pivotably supported press roller which cooperates with the smaller diameter portion to drive the tape and, when the cartridge is not in use, the pinch roller is pivoted away from the press roller, a projection is provided which cooperates with the press roller to grasp the tape firmly when the cartridge is not in use, thereby preventing the tape from getting damaged.

3 Claims, 4 Drawing Figures

TAPE CARTRIDGE

BACKGROUND OF THE INVENTION

1. Field of the Invention

This invention relates to endless tape cartridges and, more specifically, to endless tape cartridges in which the tape is driven at a rate different from the peripheral speed of the tape recorder capstan.

2. Description of the Prior Art

The prior art will be discussed more fully as a counterpoint to the description of the preferred embodiment. However, generally speaking, the prior art consists of devices in which the pivoting of the press roller was limited by a stop which served no other purpose and the tape was allowed to become quite slack around the pinch roller when the cartridge was not in use. This configuration suffered from the disadvantage that the slack portion of the tape tended to get intertwined with the pinch roller, resulting in damage to the tape when the cartridge was again put into use.

SUMMARY OF THE INVENTION

The object of the present invention is to provide the tape from getting damaged when the cartridge is not in use. This object is accomplished by providing a projection, which is preferably a part of the pinch roller holder, which, when the cartridge is not in use, serves both to limit the pivoting of the press roller and, in cooperation with the press roller, to grasp the tape firmly, preventing it from becoming intertwined with the pinch roller. The press roller and the projection may be positioned so that together they take up the slack which would otherwise be present in the tape when the cartridge is not in use or they may simply hold the slack portion of the tape, preventing it from becoming intertwined with the pinch roller.

DESCRIPTION OF THE PREFERRED EMBODIMENT

In order to better understand the present invention, the prior art will first be discussed in greater detail.

Figure 1:
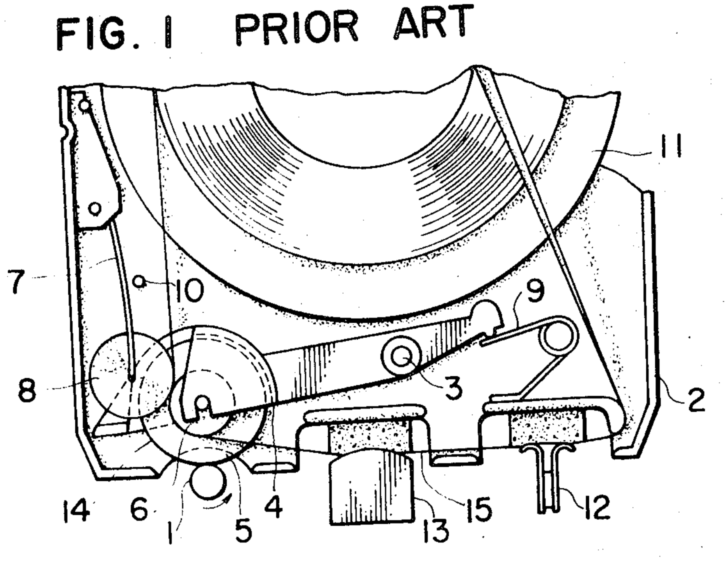
FIG. 1 PRIOR ART
FIG. 1 is a fragmental plan view of a prior-art endless tape cartridge in use, but with the upper cover removed.
Figure 2:
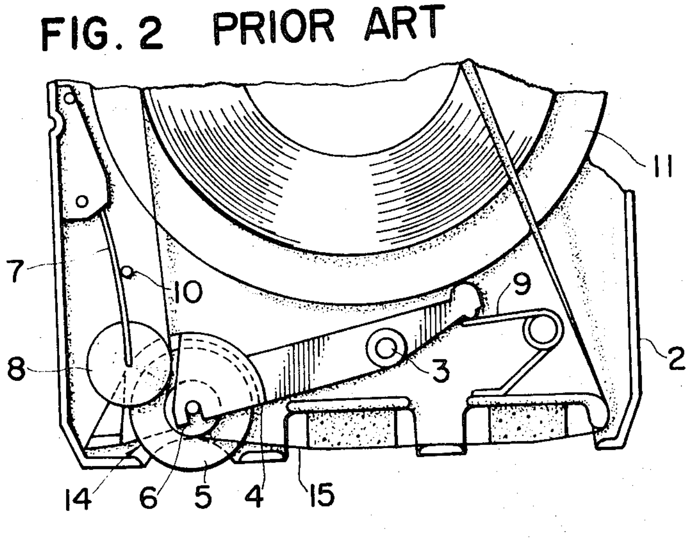
FIG. 2 PRIOR ART
FIG. 2 is a fragmental plan view of a prior-art endless tape cartridge not in use, again with the upper cover removed.

A conventional cartridge in which the tape is driven at a rate different from the peripheral speed of the tape recorder capstan is illustrated in FIGS. 1 and 2. FIG. 1 shows the cartridge in use, while FIG. 2 shows it not in use.

As illustrated in FIG. 1, when the cartridge is in use, the capstan 1 of the tape recorder rotates counterclockwise while in contact under pressure with the larger diameter portion 5 of a pinch roller 14 mounted rotatably on a pinch roller holder 4 which in turn is pivoted to a shaft 3 of the cartridge 2, thereby rotating the smaller diameter portion 6 of the pinch roller 14, which portion is integral with the larger diameter portion 5. The tape 15 is pinched between the smaller diameter portion 6 of the pinch roller 14 and a press roller 8 urged against the smaller diameter portion 6 of the pinch roller 14 by means of a spring 7 on which it is rotatably mounted, whereby the tape 15 is driven at a rate corresponding to the peripheral speed of the smaller diameter portion 6 of the pinch roller 14. The pressure of the capstan 1 against the larger diameter portion 5 of the pinch roller 14 is sufficient to overcome the counterclockwise bias of the spring 9 on the pinch roller holder 4, and the tape 15 is driven tautly past the sensing pole 12 and the head 13 of the tape recorder.

When the cartridge is not in use, the condition illustrated by FIG. 2, the spring 9, no longer counterbalanced by pressure from the capstan 1, rotates the pinch roller holder 4 in the counterclockwise direction about the shaft 3. As a result, the right-hand end or brake of the pinch roller holder 4 abuts upon a peripheral portion of the tape support or reel 11, preventing its rotation, and the smaller diameter portion 6 of the pinch roller 14 moves downward in the drawing to depart from the press roller 8. The spring 7 urges the press roller 8 to the right, but the motion of the spring 7 is limited by a stop 10 which holds the press roller 8 in a position spaced from the smaller diameter portion 6 of the pinch roller. The purpose of this spacing is to insure that, when the cartridge 2 is not in use, there is no static engagement under pressure of the press roller 8 with the smaller diameter portion 6 of the pinch roller 14, thereby preventing generation of "wow" and "flutter" which otherwise would result due to deformation of the smaller diameter portion 6 of the pinch roller 14, which portion is made of an elastic substance. However, because the tape 15 is loosely wound about the tape support 11 and the portion of the tape 15 which is outside the tape support 11 is pinched by no means when the cartridge is not in use, that portion of the tape can slip off its guides and become still further loosened. If it does, when the cartridge is put back in use the loosened tape portion tends to get intertwined with the smaller diameter portion 6 of the pinch roller 14, and this intertwining can easily result in the tape being damaged or cut.

The present invention resides in a cartridge designed both to obviate static deformation of the smaller diameter portion of the pinch roller and to prevent the tape portion which is outside the tape support when the cartridge is not in use from getting intertwined with the smaller diameter portion of the pinch roller.

Figure 3:
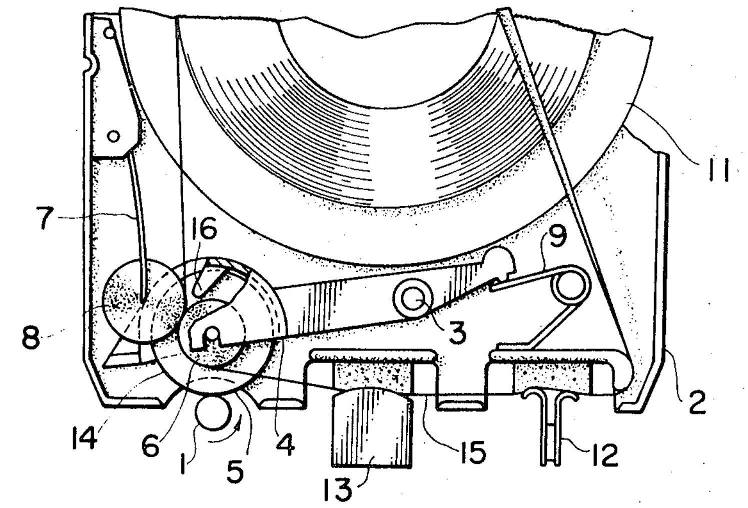
FIG. 3 is a fragmental, partially sectional plan view of an endless tape cartridge embodying the present invention. The cartridge is shown in use, but with the upper cover removed.
Figure 4:
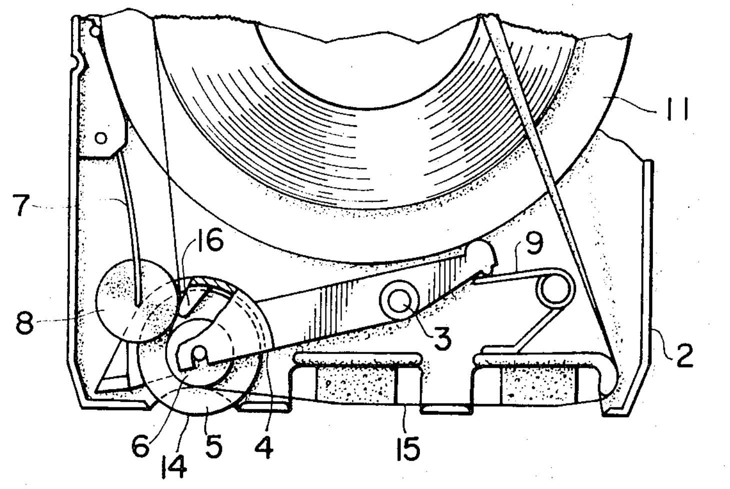
FIG. 4 is a fragmental, partially sectional plan view of an endless tape cartridge embodying the present invention. The cartridge is shown not in use, and again the upper cover has been removed.

This invention will now be illustrated by description of the preferred embodiment depicted in FIGS. 3 and 4. The cartridge illustrated therein is generally similar to the cartridge illustrated in FIGS. 1 and 2, with the same parts being indicated by the same numbers, and only the parts which differ from those in the prior-art cartridge previously described will be described now.

The only physical difference between the prior art cartridge depicted in FIGS. 1 and 2 and the cartridge embodying the present invention depicted in FIGS. 3 and 4 is the elimination of the stop 10 in the prior art cartridge and its replacement with the projection 16 which, in this illustrative embodiment, is a part of the pinch roller holder 4. When the cartridge is in use, the point of the projection 16 is positioned between the smaller diameter portion 6 of the pinch roller 14 and the tape 15 and close to both of them. When the cartridge is not in use, the pinch roller holder 4 and the pressure roller 8 will pivot as before, but the movement of the press roller 8 will be limited, not by a stop such as stop 10 in the prior art configuration, but by the projection or brake 16. This projection accomplishes the same result of spacing the smaller diameter portion 6 of the pinch roller 14 from the press roller 8 as did the stop 10, and it also prevents the portion of the tape 15 which is outside the tape support 11 from slipping off its guides, becoming intertwined with the smaller diameter portion 6 of the pinch roller 14, and getting damaged when the cartridge is again put in use. Even at the time when the cartridge 2 is again loaded in the tape recorder and the capstan 1 is in contact under pressure with the larger diameter portion 5 of the pinch roller 14 and ready for use, the tape 15 has no loosened portion and, of course, the point of projection 16 is located in the vicinity of the periphery of the smaller diameter portion 6 of the pinch roller 14, so that the tape 15 cannot get intertwined with the smaller diameter portion 6 of the pinch roller 16 and cannot be damaged or cut.

While the invention has been particularly shown and described with reference to the preferred embodiment thereof, it will be understood by those skilled in the art that various changes in form and detail may be made therein without departing from the spirit and scope of the invention.

What is claimed is:

1. An endless tape cartridge comprising; a reel supported in said cartridge and carrying an endless tape coil, means forming a loop of tape passing to and from said coil, a pinch roller lever, means pivotally mounting said lever intermediate its ends outside of the periphery of said reel within said loop, a spring pressed roller mounted in said cartridge outside of said loop, a pinch roller on one end of said lever and having two portions of different diameters with one portion adapted to be engaged by a capstan and the other portion engaging said tape and pressing said tape against said spring biased press roller when said capstan engages said one portion of said pinch roller during cartridge use, and means biasing said lever to pivot said pinch roller away from said press roller when said capstan moves away from said pinch roller and said cartridge is not in use, and braking means carried by the other end of said lever for contacting said reel to brake said reel when said cartridge is not in use, the improvement comprising:

second braking means operatively associated with said press roller to grasp the tape firmly between the press roller and said braking means when the cartridge is not in use, thereby preventing the tape from getting damaged subsequently when the cartridge is put back into use.

2. An endless tape cartridge as claimed in claim 1 wherein the portion of said pinch roller which abuts under pressure against the capstan of the tape recorder is the larger diameter portion of said pinch roller and the portion of said pinch roller which abuts under pressure against the press roller is the smaller diameter portion of said pinch roller.

3. An endless tape cartridge as claimed in claim 2, wherein said second braking means comprises a projection on said pinch roller lever.

* * * * *